United States Patent [19]
Merle et al.

[11] Patent Number: 5,618,093
[45] Date of Patent: Apr. 8, 1997

[54] THRUST CARTRIDGE FILMSTRIP VIEWER

[75] Inventors: Thomas C. Merle, Rochester; Dennis F. Tianello, Spencerport, both of N.Y.

[73] Assignee: Eastman Kodak Company, Rochester, N.Y.

[21] Appl. No.: 469,035

[22] Filed: Jun. 6, 1995

[51] Int. Cl.[6] .................................................. G03B 21/11
[52] U.S. Cl. .................................. 353/26 R; 353/DIG. 2; 40/364; 40/367
[58] Field of Search ........................... 353/22, 23, 24, 353/26 R, 39, DIG. 2, 95, 96; 359/798, 801, 802, 803, 807; 40/362, 363, 364, 366, 367

[56] References Cited

U.S. PATENT DOCUMENTS

| | | | |
|---|---|---|---|
| 3,543,424 | 12/1970 | Klein | 40/362 |
| 3,638,875 | 2/1972 | Schwartz et al. | 353/DIG. 2 |
| 3,785,073 | 1/1974 | Van Tine | 40/63 A |
| 4,234,244 | 11/1980 | Klein | 359/806 |
| 4,255,026 | 3/1981 | Ebener, Jr. | 353/DIG. 2 |
| 4,389,803 | 6/1983 | Dunn | 40/362 |
| 4,491,434 | 1/1985 | Barr et al. | 40/362 |
| 5,030,978 | 7/1991 | Stoneham et al. | 354/21 |
| 5,231,438 | 7/1993 | Smart | 354/781 |
| 5,287,136 | 2/1994 | Kitagawa et al. | 354/173.1 |
| 5,363,156 | 11/1994 | Tianello et al. | 353/DIG. 2 |
| 5,424,790 | 6/1995 | Tsunefuji et al. | 353/DIG. 2 |
| 5,521,662 | 5/1996 | Suzuki | 354/76 |

*Primary Examiner*—William Dowling
*Attorney, Agent, or Firm*—Christopher J. Fildes

[57] ABSTRACT

A filmstrip viewer is provided for viewing positive or negative images on filmstrips contained in so-called thrust film cartridges. The viewer has a film drive for advancing film from the thrust cartridge to a take-up spool for selectively advancing frame images into a frame viewing station for direct or projection viewing. Natural, or artificial illumination may be provided. Optional motorized or manual drives may be used to provide film advance and rewind functions. An interlocked loading door can prevent attempted removal of a cartridge prior to full rewinding of the filmstrip and, optionally, require a specific spool parking orientation prior to opening of the loading door.

14 Claims, 3 Drawing Sheets

THRUST CARTRIDGE FILMSTRIP VIEWER

FIELD OF THE INVENTION

This invention relates to film transparency viewers and, in particular, to viewers for film transparencies contained on a filmstrip within a film cartridge.

BACKGROUND OF THE INVENTION

It is known in the art relating to film transparency viewers to provide a viewer for viewing transparencies contained on a filmstrip. It is further known, relative to filmstrip viewers, to use a filmstrip that is stored in a conventional film cartridge in which a leader portion of the film extends externally for use in attaching the cartridge held film to a take-up spool in the viewer.

Recently, a new type of film cartridge, called a "thrust cartridge", has been developed for cameras wherein the film is capable of being thrust out of the cartridge by rotating the cartridge spool in the appropriate direction. This feature allows the film within a cartridge to be completely enclosed within the cartridge, rather than having the end of the film extending therefrom. Specifics regarding the structure and operation of one type of thrust cartridge can be found in commonly-assigned U.S. Pat. No. 5,231,438, issued Jul. 27, 1993.

When loading a thrust cartridge in a camera, the cartridge is loaded through the loading opening and the loading door is closed to prevent light from entering the camera and exposing the film. The cartridge spool is then rotated in the appropriate direction to thrust the film from the cartridge and through the film track. Once the film reaches the end of the film track, it is engaged by the take-up roll. Thereafter, a transfer of drive power occurs between the cartridge spool and the take-up spool. That is, the thrusting of the film by the cartridge spool is deactivated, and further movement of the film is provided by a pulling action of the take-up spool. When rewinding of the film into the cartridge is desired, drive power is provided by the cartridge spool by rotating the cartridge spool in the appropriate direction to rewind the film.

U.S. Pat. No. 5,287,136, issued Feb. 15, 1994, discloses a camera with a film drive that automatically advances and rewinds a thrust film cartridge. To thrust film from the cartridge, a controller directs a motor to drive the cartridge spool in the advance direction to thrust film from the cartridge. Once the film is advanced into engagement with the take-up spool, the controller actively directs the motor to stop driving the cartridge spool and to commence driving the take-up spool. When rewind of the film is desired, the controller directs the motor to stop driving the take-up spool and to commence driving the cartridge spool in the rewind direction. To perform the various drive functions, the described camera utilizes a combination of a reversible motor, two on/off clutches, and a controller for selectively activating and deactivating the motor and the clutches.

There has now also been developed a manual film transport apparatus for cameras using film in thrust cartridges. The apparatus generally includes a camera body adapted to receive a thrust film cartridge. Also included are a thrust spindle for engagedly receiving a thrust cartridge spools a take-up spool, and a drive mechanism (e.g., a thumb wheel or ratchet lever) for simultaneously driving both the thrust spindle and the take-up spool in a thrust direction such that a surface speed of the take-up spool is faster than a surface speed of film being thrust from the thrust cartridge.

In one embodiment, the drive mechanism may include a drive wheel operatively interconnected with both the thrust spindle and the take-up spool. A first one-way clutch is operatively connected to the drive wheel and the thrust spindle to allow the drive wheel to drive the thrust spindle in the thrust direction while substantially preventing the drive wheel from driving the thrust spindle in a rewind direction. For example, the first clutch may include a driver element operatively associated with the drive wheel and a follower element operatively associated with the thrust spindle. In addition, the drive mechanism may further include a second one-way clutch operatively connected to the drive wheel and the take-up spool to allow the drive wheel to drive the take-up spool in the thrust direction while substantially preventing the drive wheel from driving the take-up spool in the rewind direction. The second clutch may include a driver element operatively associated with the drive wheel and a follower element operatively associated with the take-up spool.

In order to provide synchronous motion of the first and second clutches, the drive mechanism preferably includes a direct mechanical interconnection between the first clutch and the second clutch. For example, such direct mechanism interconnection may be through a belt, a chain or a gear train. The apparatus may further include a rewind mechanism (e.g., a rewind knob) for driving the thrust spindle in a rewind direction. A third clutch may be operatively positioned between the rewind mechanism and the rewind spindle to allow the rewind mechanism to drive the rewind spindle in the rewind direction while substantially preventing the rewind mechanism from driving the rewind spindle in the thrust direction.

SUMMARY OF THE INVENTION

The present invention provides various embodiments of film viewers for use with filmstrips stored within thrust cartridges of the type developed for use in cameras and in film processing. The cartridges may contain film with negative images or, for example, positive color images or transparencies intended for viewing by a user either in a direct viewing apparatus or through projection of the image on a screen.

In its broadest concept, a viewer according to the invention incorporates the basic features of a film transport mechanism for a camera using thrust film cartridges and combines them with the basic features of a filmstrip frame viewer and/or projector of any suitable type. The film motion apparatus may be motorized or manually powered. The viewer may use natural light or a separate light source. The viewer may be provided with a magnifying lens for viewing or a lens for projecting an image onto a screen. The screen may be translucent and carried on the viewer body or it may be separate from the viewer. The viewer will provide suitable means for receiving or removal of filmstrip cartridges and may include sensing devices to identify the filmstrip as exposed and/or otherwise suitable for projection or viewing in the viewer. The viewer may be provided with interlock mechanisms or devices to prevent removal of a film cartridge before the film is fully rewound into the cartridge.

The film transport apparatus for the viewer may include an interlock mechanism, such as that described in the previously mentioned U.S. Pat. No. 5,231,438. This interlock mechanism prevents the cartridge loading door from being opened prior to full rewinding of the film back into the cartridge so that the film will not be damaged by attempting to remove the cartridge from the camera when the film has not been fully rewound. It may also require that the cartridge spool be parked (stopped) in a specified position before the loading door may be opened. The spool position may be used to indicate the previously processed, and therefore usable, condition of the filmstrip in the cartridge.

These and other features and advantages of the invention will be more fully understood from the following detailed description of the invention taken together with the accompanying drawings.

DETAILED DESCRIPTION OF THE INVENTION

Figure 1:
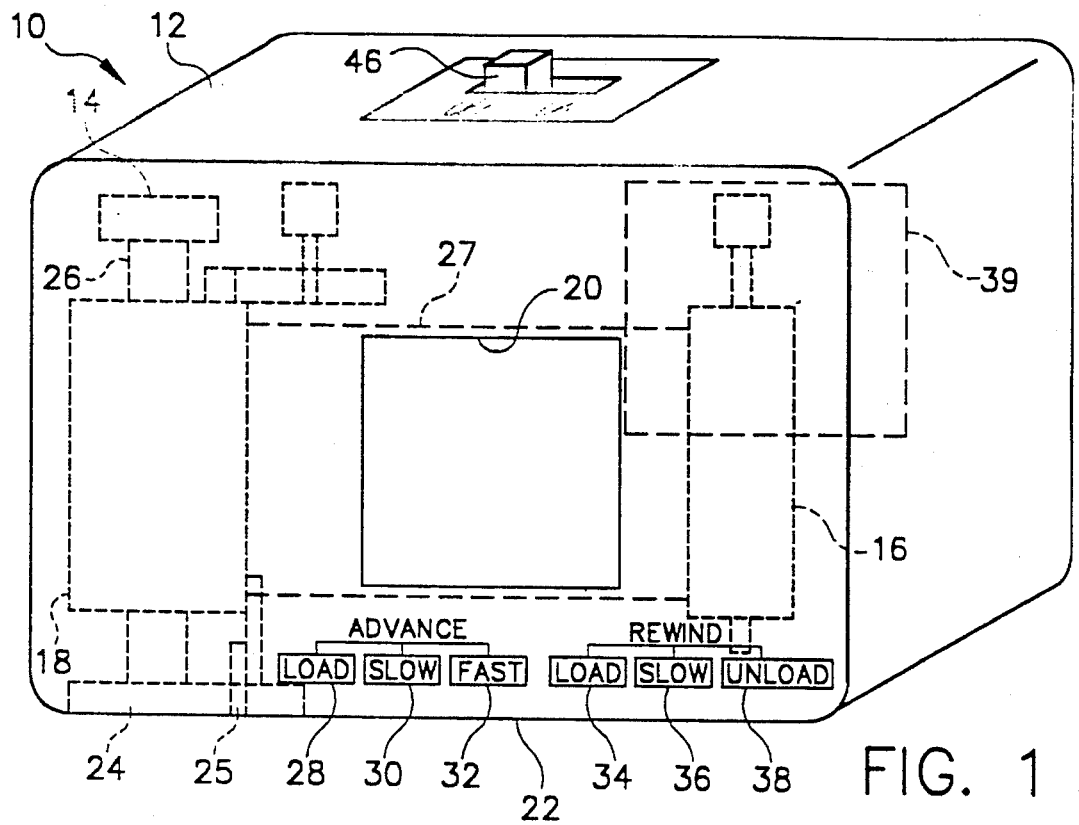
FIG. 1 is a pictorial view of a hand held film transparency viewer formed in accordance with the invention.

Referring first to FIG. 1 of the drawings in detail, numeral 10 generally indicates a first embodiment of filmstrip viewer formed in accordance with the invention. Viewer 10 includes a body 12 enclosing internally a film drive generally indicated by numeral 14. The body 12 also encloses a film take-up spool 16 located near one end of the body and a thrust film cartridge 18 removably mounted near the other end of the body. A generally rectangular opening 20 is located in a front wall 22 of the body generally intermediate the take-up spool 16 and the thrust film cartridge 18.

Body 12 is also provided with a loading opening closed by a light proof door 24 mounted in a lower wall of the viewer and openable for transferring film cartridges into and out of the body. Door 24 may be connected with an interlock 25 that prevents the door 24 from being opened unless the film is fully wound within the cartridge 18. Interlock 25 may also require that the cartridge spool be parked (stopped) at a prescribed orientation before the door 24 may be opened. A thrust spindle 26 is rotatably mounted within the body 12 and connects with a film spool within cartridge 18 when a cartridge is present within the viewer body.

Film drive 14 may be of any suitable type which is operable to drive thrust spindle 26 in both film advance and rewind directions and to drive take-up spool 16 in at least the film advance direction. A film guide such as track 27 must also be provided for guiding the film in its movement from the film cartridge to the take-up spool and return and for maintaining the film in a generally flat condition as it is passed across a film viewing station at opening 20 in the front wall of the viewer.

A controllable film drive system which could be adapted for use in a viewer according to the invention is described in the previously mentioned U.S. Pat. No. 5,287,136. A control within the viewer may be connected with external controls, such as electronic switches 28, 30, 32, 34, 36, 38, to respectively unlock the loading door for loading a film cartridge, advance the film slowly from the cartridge along the film track to driving engagement with take-up spool 16, advance the film faster in the advance direction to locate a predetermined image at the film viewing station at viewing opening 20, rewind the film at a slow speed, or a fast speed and open loading door 24 for ejection and removal of a rewound cartridge from the viewer. Alternatively, a manual film drive apparatus could be used in a viewer according to the invention. An example of such an apparatus will be subsequently described.

Figure 3:
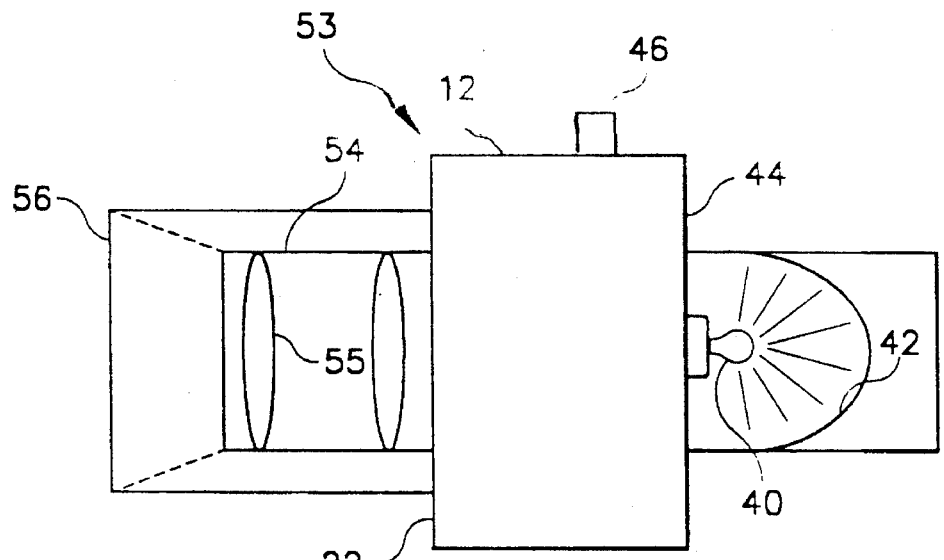
FIG. 3 is schematic side view showing an alternative embodiment including a light source and a projection lens for use in a viewer.

Viewer body 12 may include a light path, such as opening 39 in the rear wall of the viewer, for admitting natural or artificial light to illuminate images on individual frames of the film for viewing through viewing opening 20. Optionally, as shown in FIG. 3, an internal lighting system may be provided, including a light source 40 mounted in a recess 42 formed on the interior of the back wall 44 of the viewer and positioned to illuminate a film frame in the viewing station at opening 20. An on-off switch 46 may be provided on the body for controlling illumination from the light source 40.

Figure 2:
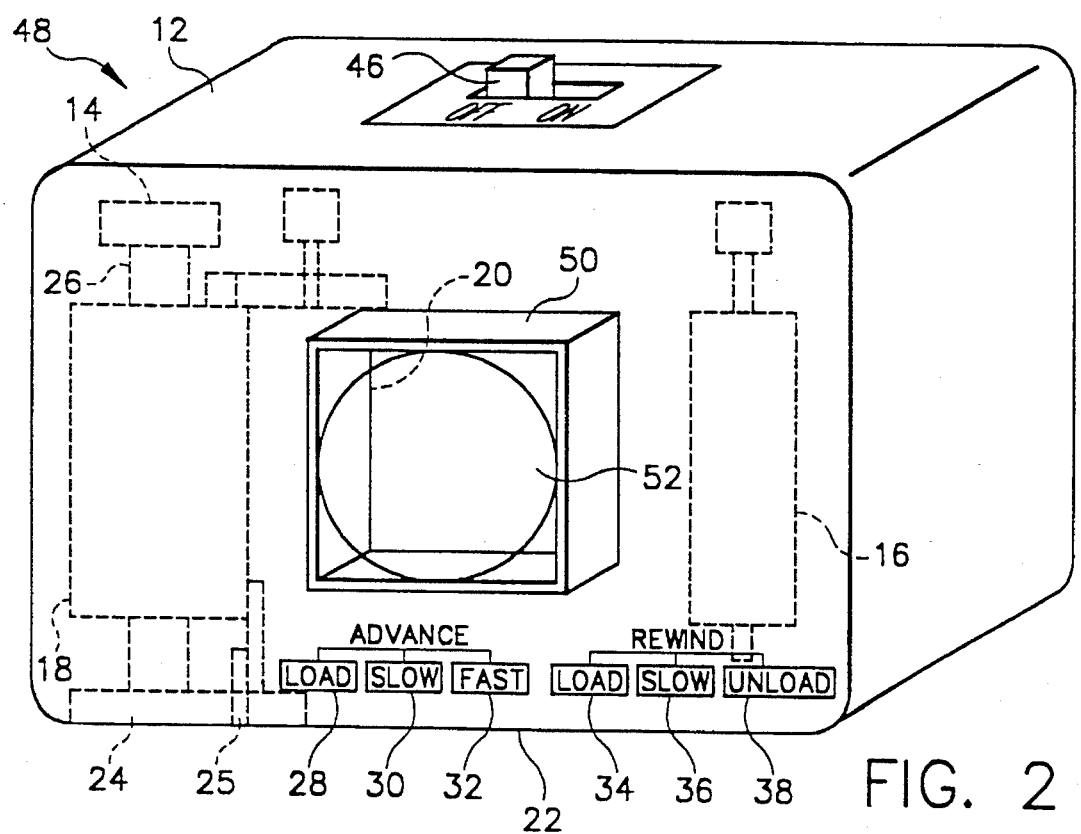
FIG. 2 is a view similar to FIG. 1 showing an alternative embodiment of viewer in accordance with the invention.

FIG. 2 illustrates an alternative embodiment of viewer generally indicated by numeral 48. Viewer 48 is similar to that of FIG. 1 except for the addition on the front wall of a projecting frame 50 on which a magnifying lens 52 is mounted for enlarging the image to be viewed by the operator through opening 20 in the front wall of the viewer.

In an alternative embodiment 53, a modified frame 54 may be modified to enclose a projection lens assembly 55 as illustrated in FIG. 3. With such an arrangement, the window or screen could be removed from viewing opening 20 and a light source 40 can be provided so that images from film located in the frame viewing station at opening 20 (FIG. 1) can be projected through the projection lens assembly 55 onto an external screen, such as a wall for other flat surface. Means for adjusting the focus of the lens 55 can also be provided.

Figure 4:
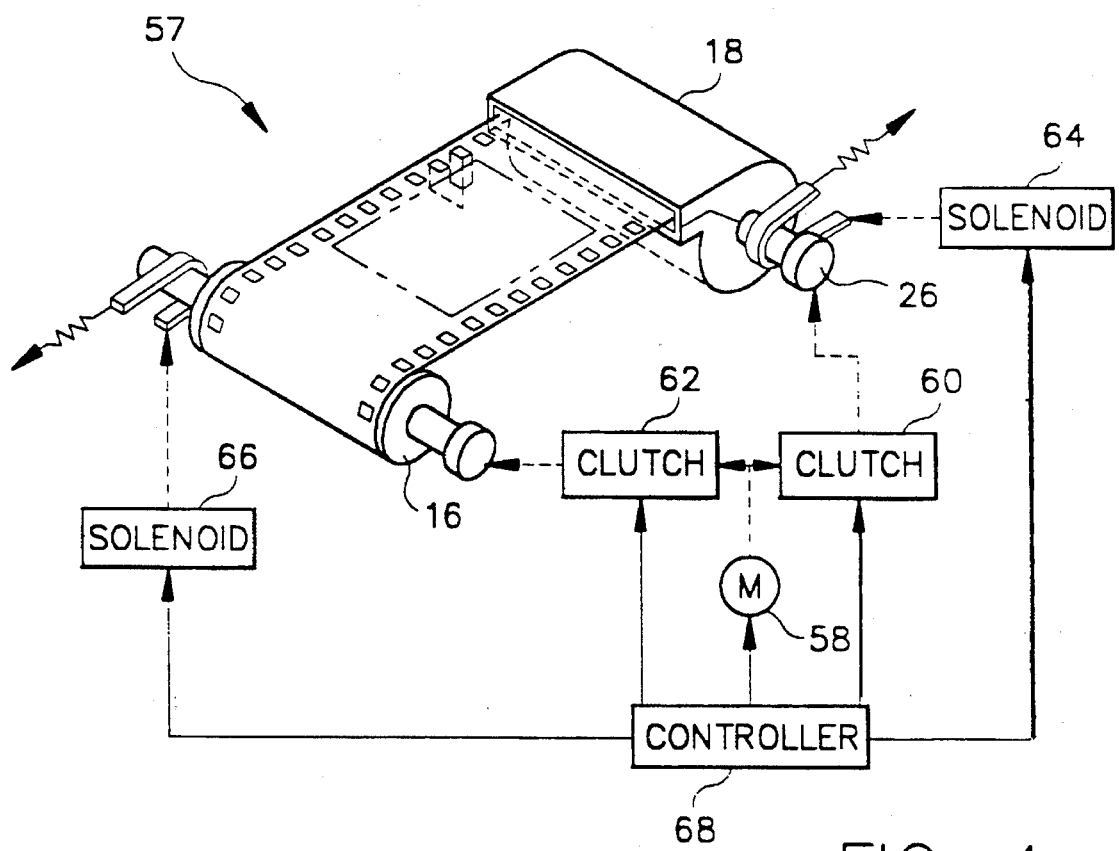
FIG. 4 is a pictorial and schematic view of an automatic powered film transport apparatus for use in a viewer according to the invention.
Figure 5:
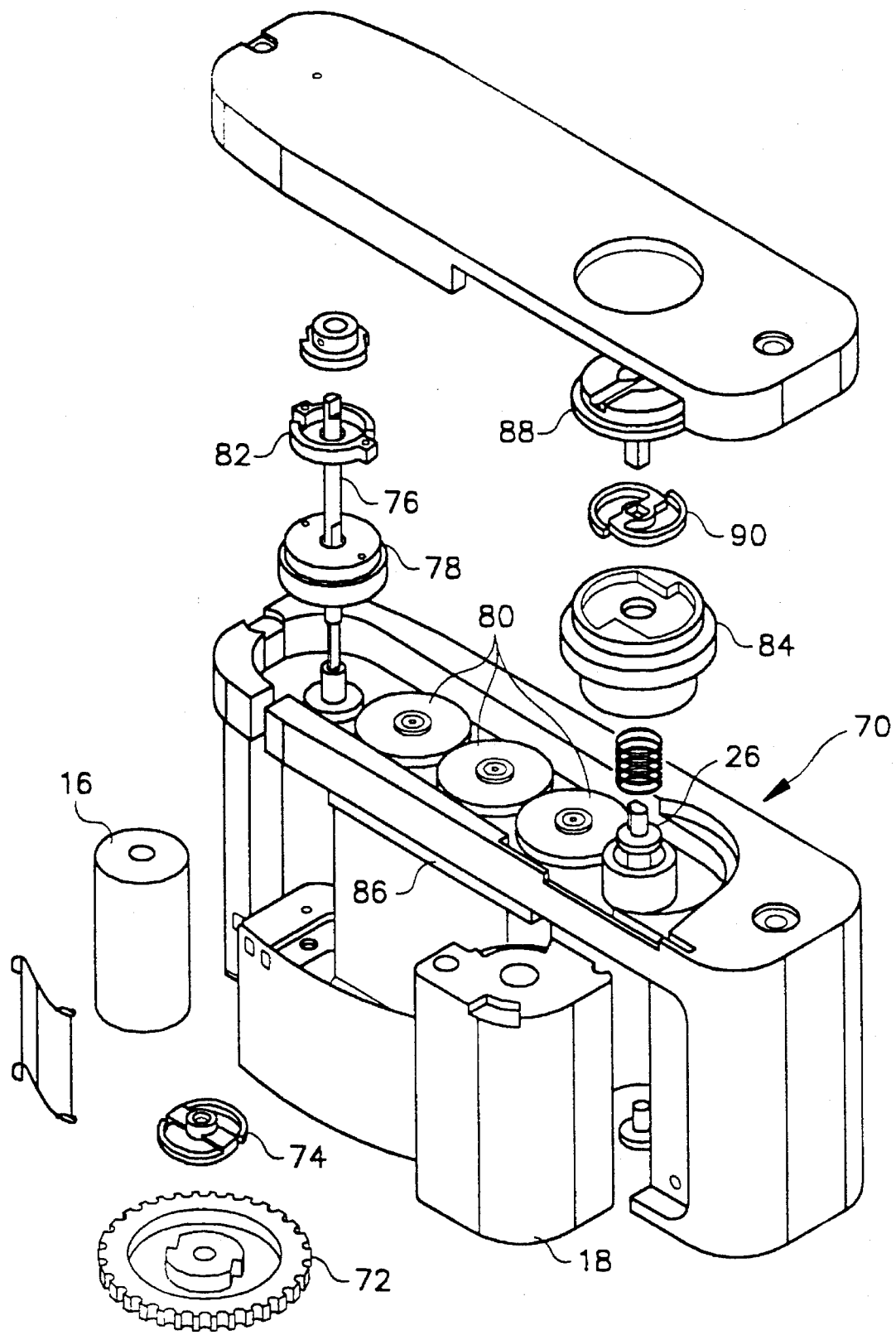
FIG. 5 is an exploded pictorial view of a manual film transport system capable of use in a viewer according to the invention.

FIG. 4 illustrates a motorized electronically controlled film drive system similar to that shown in the previously mentioned U.S. Pat. No. 5,287,136 and adapted for use as the film drive 14 in the viewers 10, 48, 53 of FIGS. 1–3. FIG. 5 illustrates an optional manual film drive apparatus which is also adaptable for use in the film viewers 10, 48, 53 of FIGS. 1–3.

The motorized film drive 57 of FIG. 4 includes a motor 58 connected through a clutch 60 with thrust spindle 26 that drives the spool of film cartridge 18. Motor 58 is also connected through a clutch 62 with the take-up spool 16. Solenoid brakes 64, 66 may also be provided to maintain tension on the film. The solenoid brakes 64, 66 clutches 60, 62 and motor 58 are all controlled by a controller 68 operated by suitable control means such as operator actuated switches 28–38 previously recited.

In operation, a thrust film cartridge 18 is loaded into viewer body 12 and light door 24 is closed. Controller 68 is then actuated to drive motor 58 in a film advance direction and clutch 60 is engaged to turn thrust spindle 26 and thrust the film out of the cartridge 18, across the guiding track 27 and into engagement with take-up spool 16. When the film is so engaged, controller 68 engages clutch 62 to draw the film onto take-up spool 16 by the motorized drive 57. At the same time, clutch 60 is disengaged so that takeup spool 16 is thereafter utilized for moving the film in a film advance direction.

The film may be advanced by the operator on a frame to frame basis by suitably controlling operation of motor 58 through controller 68. Or, if desired, the film can be advanced past several frames with either operator control or automatic control of the film drive to move the proper frame into the frame viewing station 20.

When all the frames of the film have been viewed or the operator desires to terminate viewing of selected frames, controller 68 is actuated in a rewind mode by the operator. The controller then disconnects clutch 62, rotates motor 58 in the reverse, rewind direction and engages clutch 60 to drive thrust spindle 26 in the rewind direction, drawing the film back into thrust cartridge 18. When the film is fully withdrawn or rewound into the cartridge, loading door 24 may be opened and cartridge 18 may be withdrawn or ejected from the viewer for replacement by another cartridge if desired.

Referring now to FIG. 5, there is shown an optional manually operable film drive apparatus generally indicated by numeral 70. Drive 70 includes a film advance wheel 72 which drives a take-up spool 16 through a one-way clutch 74 connected with a take-up spindle 76. Clutch 74 is arranged so that the wheel 72 can only rotate take-up spool 16 in a clockwise direction as viewed from the top in the figure. Take-up spindle 76 also drives a take-up gear 78 and an associated gear train 80 through a one-way transfer clutch 82, resulting in clockwise rotation of a connected thrust gear 84 which drives thrust spindle 26 and the associated spool within cartridge 18 in a clockwise direction. Accordingly, clockwise rotation of the advance wheel 72 results in thrusting of film from the thrust cartridge 18 along a guide track 86 and into engagement with take-up spool 16.

The take-up spool is geared to move the film faster than does rotation of the cartridge film spool. Therefore, engagement of the film with take-up spool 16 transfers the driving force, moving the film in an advance direction from the cartridge 18 spool to the take-up spool 16. Thus, the continued clockwise rotation of advance wheel 72 is capable of moving the film frame images into position in the frame viewing station sequentially, or as desired by the viewer operator.

The manual film drive 70 also includes a rewind mechanism in the form of a rewind knob 88 that connects through a one-way clutch 90 with thrust spindle 26. Clutch 90 is arranged to transfer drive only in a counterclockwise direction from rewind knob 88 to thrust spindle 26 and thereby to the film spool in cartridge 18. Thus, counterclockwise rotation of the rewind knob will drive the cartridge film spool in the counterclockwise, rewind direction, causing motion of the film from the take-up spool into the film cartridge.

During such rewind motion, take-up spindle 76 also is driven to rotate the take-up spool 16 in the rewind direction. This action loosens the film on the take-up spool but has been proven not to cause difficulties in rewinding film with a manual drive mechanism. On the other hand, clutch 90 prevents clockwise rotation of rewind knob 88 from turning the cartridge film spool in a film advance direction and clutch 82 likewise prevents clockwise rotation of the rewind knob from turning take-up spool 16 in a film advance direction. Likewise, counterclockwise rotation of advance wheel 72 is prevented from rotating the film advance wheel in a rewind direction by clutch 74.

Although the invention has been described by reference to a certain specific embodiments, it should be understood that numerous changes may be made within the spirit and scope of the inventive concepts described. Accordingly, it is intended that the invention not be limited to the described embodiments, but that it have the full scope defined by the language of the following claims.

| Parts List | | | |
|---|---|---|---|
| 10. | viewer (1st embodiment) | 52. | lens |
| 12. | body | 53. | viewer embodiment |
| 14. | film drive | 54. | frame |
| 16. | take-up spool | 55. | projection lens assembly |
| 18. | thrust film cartridge | 56. | screen |
| 20. | opening | 57. | motorized film drive |
| 22. | front wall | 58. | motor |
| 24. | door | 60. | clutch |
| 25. | interlock | 62. | clutch |
| 26. | thrust spindle | 64. | solenoid brake |
| 27. | track | 66. | solenoid brake |
| 28. | switch | 68. | controller |
| 30. | switch | 70. | manual film drive |
| 32. | switch | 72. | advance wheel |
| 34. | switch | 74. | one way clutch |
| 36. | switch | 76. | take-up spindle |
| 38. | switch | 78. | take-up gear |
| 39. | light opening | 80. | gear train |
| 40. | light source | 82. | one way transfer clutch |
| 42. | recess | 84. | thrust gear |
| 44. | back wall | 86. | guide track |
| 46. | switch | 88. | rewind knob |
| 48. | viewer | 90. | one way clutch |
| 50. | frame | | |

What is claimed is:

1. A viewer for filmstrips carried in a thrust cartridge, said viewer characterized by:

a body adapted to receive such thrust film cartridge, said body includes a load opening for transfer of thrust cartridges into and out of said body, and a light door for closing said loading opening after loading of the cartridge;

a thrust spindle for engagedly receiving a thrust cartridge spool;

a film take-up spool;

a drive for driving said thrust spindle and said take-up spool in an advance direction and for selectively driving said thrust spindle in a rewind direction;

a frame viewing station between said thrust spindle and said take-up spool for selectively receiving individual frames of a film strip for viewing;

a light path for passing light through a frame at said viewing station for viewing an image by a user; and an interlock operative to prevent opening of said light door unless the filmstrip has been fully rewound into said cartridge.

2. The invention as in claim 1 characterized by a lens spaced from said viewing station for magnifying said image observed by a user.

3. The invention as in claim 1 characterized by a light source aligned with said viewing station for illuminating said frame.

4. The invention as in claim 1 characterized by a lens spaced near said viewing station for projecting said image onto a screen.

5. The invention as in claim 4 characterized in that said screen is carried by said body, spaced from said viewing station and translucent for viewing on a side opposite from said lens.

6. The invention as in claim 5 characterized by a light source aligned with said viewing station for projecting said image into said screen.

7. The invention as in claim 1 characterized in that said interlock is further effective to prevent opening of said light door unless said cartridge spool is parked with a predetermined orientation in said cartridge.

8. The invention as in claim 1 characterized in that said drive includes a motor and control for powered frame to frame film advance and power rewind.

9. The invention as in claim 1 characterized in that said drive includes a manually actuated mechanism for providing film advance and rewind operations.

10. A viewer for filmstrips carried in a thrust cartridge, said viewer characterized by:

a body adapted to receive a thrust film cartridge having a filmstrip wound about a film spool contained therein;

a thrust spindle for engaging said film spool;

a drive for driving said thrust spindle so as to cause the filmstrip to be driven out or back into said cartridge;

a frame viewing station for selectively receiving individual frames of said filmstrip for viewing;

a light path for passing light through a frame at said viewing station for viewing an image by a user;

sensing means for identifying the filmstrip and determining if it is suitable for said viewer; and an interlock device for preventing operation of said device if said cartridge is not suitable when said cartridge is loaded into said viewer.

11. A viewer according to claim 10 wherein the sensing device senses whether the filmstrip is back fully within the cartridge.

12. A viewer according to claim 10 wherein said sensing device determines whether or not the film spool is stopped at a predetermined orientation before an access door is opened.

13. A viewer for filmstrips carried in a thrust cartridge, said viewer characterized by:

a body adapted to receive a thrust film cartridge through an access door, said cartridge having a filmstrip wound about a film spool contained therein;

a thrust spindle for engaging said film spool;

a drive for driving said thrust spindle so as to cause the filmstrip to be driven out or back into said cartridge;

a frame viewing station for selectively receiving individual frames of said filmstrip for viewing;

a light path for passing light through a frame at said viewing station for viewing an image by a user;

sensing means sensing whether the filmstrip is back fully within the cartridge; and an interlock device for preventing opening of said access door if said filmstrip is not fully back into said cartridge.

14. A viewer for filmstrips carried in a thrust cartridge, said viewer characterized by:

a body adapted to receive a thrust film cartridge through an access door, said cartridge having a filmstrip wound about a film spool contained therein;

a thrust spindle for engaging said film spool;

a drive for driving said thrust spindle so as to cause the filmstrip to be driven out or back into said cartridge;

a frame viewing station for selectively receiving individual frames of said filmstrip for viewing;

a light path for passing light through a frame at said viewing station for viewing an image by a user;

sensing means for determining whether or not the film spool is stopped at a predetermined orientation before the access door is opened; and an interlock device for preventing opening of said access door if said film spool is stopped at said predetermined orientation.

* * * * *